United States Patent Office 3,167,471
Patented Jan. 26, 1965

---

3,167,471
SYNERGISTIC FUNGICIDAL COMPOSITIONS
Andrea Kovacs and Renato Righi, Bologna, Italy, assignors to S.I.A.P.A. (Societa Italo Americana Prodotti Antiparassitari, S.p.A.), Rome, Italy, a corporation of Italy
No Drawing. Filed July 12, 1961, Ser. No. 123,434
Claims priority, application Italy, July 19, 1960,
12,664/60
12 Claims. (Cl. 167—22)

The invention relates to fungicide products, with special reference to increasing the potency of the fungicide compounds.

It has been found that the potency of the metal salts of alkylenebisdithiocarbamic acid, metal salts of dialkyldithiocarbamic acid and the mixtures of the said salts, can be augmented to a marked extent by adding to the said salts suitable alkaline material. The boost of activity is such that the resultant compositions may be regarded as effective and proper substitutes for copper and for dithiocarbamic derivatives taken separately.

The combinations obtainable according to the invention widen to a marked extent the fungi which can be treated with dithiocarbamic acid derivatives, and they represent a class of new, important and useful products with fungicidal and fungistatic properties. Some of these new compounds afford an increased potency while others exhibit in combination an effect known as synergism. Furthermore, in some instances, the potency of the combination in contrast to the effectiveness of dithiocarbamic acid derivative taken separately, is such towards specific fungi, that the potency of the mixture makes it something of practical value, whereas in the absence of the said alkaline material, their potency is devoid of any practical value. Further, mixtures of ethylenebisdithiocarbamic acid derivative and dimethyldithiocarbamic acid derivatives, in combination with the said alkaline material, can be employed to augment and widen the spectrum of efficiency.

The alkylenebisdithiocarbamic acid salts can be the lower alkylene compounds, such as the already mentioned ethylene compound, and the dialkyldithiocarbamic acid salt can be the lower alkyl compound such as the dimethyl compound.

The metals of the metal salts of dithiocarbamic acids, may be, e.g., sodium, potassium, ammonium, zinc, iron (bivalent and trivalent), manganese, copper (monovalent and bivalent), etc. Preferred among the latter is zinc. Any salt of the acid whereby the dithiocarbamic acid compound can function in its known fungicidal manner can be used. The alkaline materials can be present in the form of oxides, peroxides, peroxide hydrates, carbonates, bicarbonates, borates, sulfides, polysulfides, and generally combinations with weak inorganic and organic acids of alkali or alkaline-earth metals, and more generally all of those inorganic and organic compounds which give rise to an alkaline reaction in aqueous solution.

Those that have particularly proved their merit among the foregoing, are the oxides, hydrates, sulfides and polysulfides of alkaline-earth metals, with particular reference to calcium and barium. By way of alkaline materials which have demonstrated their utility pursuant to the present invention, may be cited the following: oxides, peroxides, hydrates, bicarbonates, borates, carbonates, sulfides, polysulfides, etc. of sodium, potassium, lithium, rubidium, cesium, etc.; oxides, peroxides, hydrates, sulfides, polysulfides, etc. of calcium, barium, strontium, etc.; oxides, peroxides, hydrates, carbonates, etc. of magnesium; gaseous ammonia, hydrate, carbonate, sulfide, polysulfide, etc. of ammonium; tension active anionics with an alkaline salt base, or alkaline-earth salt base, etc. with weak acids. Quaternary ammonium compounds, ammonium derivatives, etc. and generally all products capable of causing an alkaline reaction in an aqueous solution.

Exemplary of the ratio of dithiocarbamic acid derivatives to alkaline material, suitable for application under this invention, we may cite the following:

(a) For ethylenebisdithicarbamate of zinc, and barium as well as calcium hydrates, about 80:20 to 20:80.

(b) For ethylenebisdithiocarbamate of zinc, and barium as well as calcium sulfide, about 90:10 to 10:90.

(c) For ethylenebisdithiocarbamate of zinc, and barium as well as calcium polysulfide, about 80:20 to 20:80.

(d) For dimethyldithicarbamate of zinc, and barium as well as calcium hydrates, about 60:40 to 10:90.

(e) For dimethyldithiocarbamate of zinc, and barium as well as calcium sulfide, about 60:40 to 10:90.

(f) For dimethyldithiocarbamate of zinc, and barium as well as calcium polysulfide, about 70:30 to 20:80.

Resort may also be had to proportions other than those indicated above, as will be apparent from examples set forth below.

The combinations may be applied to the plants in keeping with one of the familiar methods of the application of fungicide. Hence, they may be diluted, with inert diluents, such as talc, and applied in the form of a powder, or they may be dispersed in an aqueous medium which is then spread on the plant. The mixtures are particularly suited for applications by means of an aqueous suspension of same, and in such a manner that the dithiocarbamic acid derivatives and the alkaline material may be present in amount, for each, of from a few parts per million (p.p.m.) to several hundred p.p.m., preferably several p.p.m. to a few hundred p.p.m.

As regards the preparation of the mixtures, the dithiocarbamic acid derivatives can be prepared by known procedures, and these derivatives can be combined with the aforesaid alkaline materials by any suitable procedure. Thus, for example, the alkaline material can be added during the preparation of the derivatives of the dithiocarbamic acids, or by a suitable mixing of the two components, or they can be mixed at the time of application in the field.

The mechanism whereby these alkaline materials function on the dithiocarbamic acid derivatives, can be analyzed as follows. For the sake of adopting a simple example, we shall proceed with ethylenebisdithiocarbamate of zinc, and the hydrate of calcium. If these two materials are suspended in water, the calcium hydrate reacts with ethylenebisdithiocarbamate of zinc, forming ethylenebisdithiocarbamate of calcium, which has a rose-orange color, and is soluble in water. By natural oxidation this substance converts to ethylene thiurame disulfide, and subsequently to ethylene thiurame monosulfide and elementary sulphur. On the formation of these compounds, and perhaps at the ultimate conversion of the latter to diisothiocyanate, the final product of oxidative decomposition of the alkylenebisdithiocarbamics, is provided. Thus, increased potency of the ethylenebisdithiocarbamate of zinc is obtained. Hence, unquestionably, any alkaline material acts upon the alkylenedithiocarbamic acids, causing solubilization and rectifying the controlled oxidative decomposition, to form active decomposition products under ideal and optimum conditions of activity. As a matter of fact, in addition to a solubilizing action, the alkaline materials also exert, as is supported by literature, a depolymerizing action on the derivatives of the alkylenebisdithiocarbamic acids, converting inactive polymer compounds into compounds of a lesser molecular complexity, down to biologically active monomeric compounds. It is a well-known fact that under normal conditions for the preparation of ethylenebisdithiocarbamate of zinc, a polymeric substance is produced, differing as to the degree of polymerization, depending on the method of preparation. The alkaline material solubilizes and depolymerizes the fungicide, causing controlled and optimal formation of monomeric degradation products. Thus, the products provide suitable activity under ambient conditions.

In the case of dialkyldithiocarbamic acid derivatives, as for example in the case of dimethyldithiocarbamate of zinc, the admixture of the alkaline material, such as the hydrate of calcium, converts in a controlled and optimal manner, with the intermediate formation of soluble dimethyldithiocarbamate of calcium, the dimethyldithiocarbamate of zinc into tetramethylthiurame disulfide, in accordance with a controlled oxidation process which brings about the emergence of a product the fungicide properties of which are well known and experimentally ascertained. In this instance, the admixture of alkaline material introduces only a solubilizing and regulating action, but so far as is known, no depolymerization takes place.

The analysis of the phenomenon connected with the increased activity of the mixtures of dithiocarbamic acids produced by alkaline reaction, has been confirmed by a series of chromatographic, and chemical-physical analysis which have disclosed the substances that continue to evolve in the controlled process of oxidative decomposition. Thus, for example, it has been found, that the mixture of ethylenebisdithiocarbamate of zinc, and hydrate of calcium, exhibits the same $R_f$ value in the chromatograph, and the same spectrum of activity, as a Nabam solution (a solution of disodium ethylenebisdithiocarbamate), which according to the Ludwig and Thorn theory, is active by virtue of an oxidative decomposition which leads to the formation of ethylenethiurame disulfide, with the subsequent formation of ethylene thiurame monosulfide plus sulphur. Furthermore, the research carried out with a view to determine the mechanics of the action brought to bear by metal salts of dithiocarbamic acids derivatives, have shown that said derivatives undergo, while on the plant, an evolution which comprises the formation of compounds which are particularly active against fungal infestations. It has also been noted that alkaline materials have an effect on the rate of the formation of the active compounds, as well as on the path followed in the evolution of the dithiocarbamic acids derivatives, towards the formation of the aforesaid active compounds.

The invention is further described with reference to the following examples:

EXAMPLE I

A series of aqueous dilutions of the compounds to be tested (metal salt of dithiocarbamic acid and sulfur compound) were prepared on perspex slides containing Petri microdishes, so as to obtain decreasing dilution for one compound in one direction on the slide, and decreasing dilution of the other compound in the orthogonal direction, as in the following table:

Agar nutritive was added to these microdishes, in which conidia were subsequently seeded, and the germination, growth and sporing of the conidia were evaluated from 0 to 4, on the basis of 0=absolute inhibition, 4=germination, growth and sporing equal to comparative sample.

The test fungi were *Botrytis cinerea*, isolated from a cluster of grapes and cultivated on agar malt; *Venturia pirina*, the conidia of which were washed from pear tree leaves; and *Aspergillus niger*, cultivated on agar malt.

The first evaluation was made under the microscope after 24 hours, based on the conidia germination; the second after three days of macroscopic observations, based on the growth and sporing of the fungi. Results are reported in Tables 2–6. Mixtures which have shown an enhanced effectiveness are distinguished by an asterik. Zinc dimethyldithiocarbamate is indicated by Zinc DDC.

*Table 2*

TEST FUNGUS: *Botrytis cinerea*

| Zinc DDC, p.p.m. | 555 | 185 | 62 | 21 | 7 | 2.3 | 0.75 | 0 |
|---|---|---|---|---|---|---|---|---|
| Barium Polysulfide, p.p.m.: | | | | | | | | |
| 833 | 0 | 0 | *0 | *0 | *0 | *0 | 1 | 1 |
| 278 | 0 | 0 | *0 | *0 | *0 | *1 | 1 | 2 |
| 93 | 0 | 0 | *0 | 1 | *1 | 2 | 2 | 3 |
| 31 | 0 | 0 | *0 | 1 | 2 | 2 | 3 | 4 |
| 10.3 | 0 | 0 | 1 | 1 | 2 | 2 | 3 | 4 |
| 0 | 0 | 0 | 1 | 1 | 2 | 2 | 3 | 4 |

*Table 3*

TEST FUNGUS: *Botrytis cinerea*

| Zinc DDC, p.p.m. | 555 | 185 | 62 | 21 | 7 | 2.3 | 0.75 | 0 |
|---|---|---|---|---|---|---|---|---|
| Barium Polysulfide, p.p.m.: | | | | | | | | |
| 833 | 0 | 0 | 0 | *0 | *0 | *0 | *0 | 1 |
| 278 | 0 | 0 | 0 | *1 | *1 | 2 | 2 | 2 |
| 93 | 0 | 0 | 0 | *1 | 2 | 3 | 3 | 3 |
| 31 | 0 | 0 | 0 | 3 | 3 | 4 | 4 | 4 |
| 10.3 | 0 | 0 | 0 | 3 | 3 | 4 | 4 | 4 |
| 0 | 0 | 0 | 0 | 3 | 4 | 4 | 4 | 4 |

*Table 4*

TEST FUNGUS: *Venturia pirina*

| Zinc DDC, p.p.m. | 555 | 185 | 62 | 21 | 7 | 2.3 | 0.75 | 0 |
|---|---|---|---|---|---|---|---|---|
| Barium Polysulfide, p.p.m.: | | | | | | | | |
| 833 | 0 | 0 | 0 | 0 | 0 | *0 | 1 | 1 |
| 278 | 0 | 0 | 0 | 0 | 0 | *1 | *1 | 2 |
| 93 | 0 | 0 | 0 | 0 | 0 | *1 | 2 | 3 |
| 31 | 0 | 0 | 0 | 0 | 0 | *1 | 3 | 4 |
| 10.3 | 0 | 0 | 0 | 0 | 0 | 3 | 4 | 4 |
| 0 | 0 | 0 | 0 | 0 | 0 | 3 | 4 | 4 |

*Table 5*

TEST FUNGUS: *Cercospora beticola*

| Zinc DDC, p.p.m. | 555 | 185 | 62 | 21 | 7 | 2.3 | 0.75 | 0 |
|---|---|---|---|---|---|---|---|---|
| Barium Polysulfide, p.p.m.: | | | | | | | | |
| 833 | 0 | 0 | 0 | 0 | 0 | 0 | 0 | 0 |
| 278 | 0 | 0 | *0 | *0 | *0 | 1 | 1 | 1 |
| 93 | 0 | 0 | *0 | *0 | 2 | 2 | 2 | 2 |
| 31 | 0 | 0 | *0 | *0 | *2 | 3 | 3 | 3 |
| 3.10 | 0 | 0 | *0 | *3 | *3 | 4 | 4 | 4 |
| 0 | 0 | 0 | 1 | 4 | 4 | 4 | 4 | 4 |

*Table 1*

| | | | | | |
|---|---|---|---|---|---|
| A+B | A/3+B | A/9+B | A/27+B | A/81+B | B |
| A+B/3 | A/3+B/3 | A/9+B/3 | A/27+B/3 | A/81+B/3 | B/3 |
| A+B/9 | A/3+B/9 | A/9+B/9 | A/27+B/9 | A/81+B/9 | B/9 |
| A+B/27 | A/3+B/27 | A/9+B/27 | A/27+B/27 | A/81+B/27 | B/27 |
| A+B/81 | A/3+B/81 | A/9+B/81 | A/27+B/81 | A/81+B/81 | B/81 |
| A | A/3 | A/9 | A/27 | A/81 | Testim. |

Table 6

TEST FUNGUS: *Cercospora beticola*

| Zinc DDC, p.p.m. | 555 | 185 | 62 | 21 | 7 | 2.3 | 0.75 | 0 |
|---|---|---|---|---|---|---|---|---|
| Barium Polysulfide, p.p.m.: | | | | | | | | |
| 833 | 0 | 0 | 0 | 0 | 0 | 0 | 0 | 0 |
| 278 | 0 | 0 | 0 | 0 | *0 | 1 | 1 | 1 |
| 93 | 0 | 0 | 0 | 0 | *0 | 2 | 2 | 2 |
| 31 | 0 | 0 | 0 | 0 | *0 | *1 | 3 | 3 |
| 10.3 | 0 | 0 | 0 | 0 | *0 | *1 | 3 | 3 |
| 0 | 0 | 0 | 0 | 0 | 2 | 2 | 3 | 4 |

EXAMPLE II

Mixtures of zinc ethylenebisdithiocarbamate (Zinc EBDC) with barium polysulfide in different proportions, were biologically tested against *Monilia (Sclerotinia) fructigena*, using the slide germination method; the germination, growth and sporing of the conidia were evaluated from 0 to 4 as per Example I. The results were as follows:

| Composition Mixture, percent | | Concentration, p.p.m. | | | |
|---|---|---|---|---|---|
| Zinc EBDC | Ba Polysulfide | 222 | 74 | 24.7 | 8.2 |
| 100 | ------ | 0 | 3 | 4 | 4 |
| 90 | 10 | 0 | 2 | 4 | 4 |
| 80 | 20 | 0 | 0 | 3 | 4 |
| 75 | 25 | 0 | 0 | 3 | 4 |
| 70 | 30 | 0 | 0 | 2 | 4 |
| 65 | 35 | 0 | 0 | 1 | 2 |
| 60 | 40 | 0 | 0 | *0 | *1 |
| 50 | 50 | 0 | 0 | 0 | 4 |
| ------ | 100 | 0 | 0 | 1 | 3 |

The above table shows that, while the Zinc EBDC alone, and to a lesser degree the barium polysulfide used alone, give poor control, the mixture of the two (especially in proportion 60:40) reveals a marked biological activity, showing the presence of a synergetic effect. This fact has a practical importance for a simultaneous control of Oidium, the biological characteristics of which are comparable to those of the *Monilia fructigena*.

EXAMPLE III

Mixtures of zinc ethylenedisdithiocarbamate (Zinc EBDC) with barium polysulfide were tested in the laboratory against *Phytophthora infestans*, using the slide germination method; the germination, growth and sporing of the conidia were evaluated from 0 to 4, as per Example I. The results were as follows:

| Composition Mixture, Percent | | Concentration, p.p.m. | | | | |
|---|---|---|---|---|---|---|
| Zinc EBDC | Ba Polysulfide | 666 | 222 | 74 | 24.7 | 8.2 |
| 100 | ------ | 0 | 0 | 0 | 1 | 3 |
| 90 | 10 | 0 | 0 | 0 | 1 | 3 |
| 80 | 20 | 0 | 0 | 0 | 1 | 3 |
| 75 | 25 | 0 | 0 | 0 | 1 | *2 |
| 70 | 30 | 0 | 0 | 0 | 1 | 4 |
| 65 | 35 | 0 | 0 | 0 | 1 | 4 |
| 60 | 40 | 0 | 0 | 0 | 1 | 4 |
| 50 | 50 | 0 | 0 | 0 | 1 | 4 |
| ------ | 100 | 0 | 1 | 4 | 4 | 4 |

The table shows an evident synergetic effect in the proportion 75:25.

EXAMPLE IV

Mixtures of zinc ethylenebisdithiocarbamate (Zinc EBDC) with barium polysulfide were tested four times in the laboratory against *Botrytis cinerea*, using the slide germination method; the germination, growth and sporing of the conidia were evaluated from 0 to 4, as per Example I. The results were as follows:

| Composition Mixture, Percent | | Concentration, p.p.m. | | | | | |
|---|---|---|---|---|---|---|---|
| Zinc EBDC | Ba Polysulfide | 2000 | 1000 | 500 | 250 | 125 | 62 |
| 100 | ------ | 4444 | 4444 | 4444 | 4444 | 4444 | 4444 |
| 90 | 10 | 0000 | 1000 | 2121 | 4444 | 4444 | 4444 |
| 80 | 20 | 0000 | 0000 | 0000 | 2221 | 4444 | 4444 |
| 75 | 25 | 0000 | 0000 | *0000 | *0000 | 4312 | 4444 |
| 70 | 30 | 0000 | 0000 | *0000 | *0000 | *0000 | 4444 |
| 65 | 35 | 0000 | 0000 | *0000 | *0000 | *0000 | 4444 |
| 60 | 40 | 0000 | 0000 | *0000 | *0000 | *0000 | 4444 |
| 50 | 50 | 0000 | 0000 | *0000 | *0000 | *0000 | 4444 |
| ------ | 100 | 4444 | 4444 | 4444 | 4444 | 4444 | 4444 |

The table shows a rather strong synergetic effect: while either the Zinc EBDC alone or the polysulfide alone lacks any effect, even when applied at high rates, as shown above (2,000 p.p.m. at 200 g. equals 220.46 lbs.), the mixtures 70:30, 65:35, 60:40, 50:50 have a considerable effectiveness (at least twenty times greater than that of single compounds).

EXAMPLE V

Various mixtures of Zinc EBDC and calcium hydrate with the ratio of 20:80 to 80:20 have been prepared. A number of series of dilutions were prepared from these mixtures in Petri microdishes. Nutrient agar was added to each microdish, subsequent to the suspension of the conidia of the *Aspergillus niger* fungus. Thereupon the microdishes were placed in an incubating chamber, and after a lapse of 24 hours the germination and developing of the fungus was checked, assigning the values along the scale described under Example I. The results have been shown in the ensuing table:

| Zn EBDC+Ca(OH)$_2$ | Run | Concentration (p.p.m.) | | | | | |
|---|---|---|---|---|---|---|---|
| | | 200 | 100 | 50 | 25 | 12.5 | 6.25 |
| 20/80 | I | 0 | 1 | 2 | 2 | 3 | 3 |
| | II | 0 | 1 | 2 | 2 | 3 | 3 |
| 30/70 | I | 0 | 0 | 1 | 2 | 3 | 3 |
| | II | 0 | 0 | 0 | 2 | 3 | 3 |
| 40/60 | I | 0 | 0 | 0 | 2 | 3 | 3 |
| | II | 0 | 0 | 0 | 1 | 3 | 3 |
| 50/50 | I | 0 | 0 | 0 | 0 | 2 | 3 |
| | II | 0 | 0 | 0 | 1 | 2 | 3 |
| 60/40 | I | 0 | 0 | 0 | 0 | 2 | 3 |
| | II | 0 | 0 | 0 | 1 | 2 | 3 |
| 70/30 | I | 0 | 0 | 0 | 1 | 2 | 3 |
| | II | 0 | 0 | 0 | 1 | 2 | 3 |
| 80/20 | I | 0 | 0 | 1 | 2 | 3 | 3 |
| | II | 0 | 0 | 1 | 2 | 3 | 3 |

EXAMPLE VI

Various mixtures of dimethyldithiocarbamate of zinc (Zinc DDT) and hydrate of calcium and a number of dilutions were prepared from the said mixtures, the quantity of dimethyldithiocarbamate of zinc remaining constant. To each of the series was added nutrient agar and *Aspergillus niger* test fungus. Duplicate runs were made. This was followed by the process described under Example V. The results are as follows:

| Zinc DDT+Ca(OH)$_2$ | Run | Concentration (p.p.m.) | | | | | |
|---|---|---|---|---|---|---|---|
| | | 200 | 100 | 50 | 25 | 12.5 | 6.25 |
| 1:0 | I | 0 | 0 | 0 | 3 | 3 | 3 |
| | II | 0 | 0 | 2 | 2 | 2 | 3 |
| 1:0.5 | I | 0 | 0 | 0 | 0 | 0 | 1 |
| | II | 0 | 0 | 0 | 0 | 0 | 0 |
| 1:1 | I | 0 | 0 | 0 | 0 | 0 | 0 |
| | II | 0 | 0 | 0 | 0 | 0 | 0 |
| 1:2 | I | 0 | 0 | 0 | 0 | 0 | 0 |
| | II | 0 | 0 | 0 | 0 | 0 | 0 |
| 0:1 | I | 4 | 4 | 4 | 4 | 4 | 4 |
| | II | 4 | 4 | 4 | 4 | 4 | 4 |

EXAMPLE VII

In 1959 and 1960 field tests were carried out on the *Venturia inaequalis* of the apple tree setting up a comparative study as between a substance with a dimethyldithiocarbamate of zinc base (Crittam) alone; a mixture of dimethyldithiocarbamate of zinc (Crittam)-barium polysulfide in the ratio indicated in the table; a substance having an ethylenebisdithiocarbamate of zinc (Crittox) alone; a mixture of ethylenebisdithiocarbamate of zinc (Crittox), plus barium polysulfide in the ratios listed in the table.

To ascertain the degree of infection in the various plants, the percentage of foliage infection was computed.

The results are as follows:

| Procedure | Types and Incidence of Leaves | | | | | | | | Types×Incidence=percentage of infection | | |
|---|---|---|---|---|---|---|---|---|---|---|---|
| | 0 | 1 / 0-2 | 3.5 / 2-5 | 7.5 / 5-10 | 15 / 10-20 | 30 / 20-40 | 52.5 / 40-65 | 80% / 65-95 | Total | Mean | Error |
| First 2 treatments: Crittam at 0.3%, then at 0.2% | 37 | 34 | 13 | 9 | 4 | 3 | | | 299.0 | | |
| | 41 | 20 | 15 | 11 | 7 | 5 | | 1 | 442.5 | | |
| | 35 | 23 | 22 | 12 | 3 | 4 | | 1 | 407.5 | | |
| | 24 | 24 | 23 | 10 | 13 | 5 | | 1 | 577.0 | | |
| Mean | 34.3 | 25.3 | 18.3 | 10.5 | 8.8 | 4.3 | -0.8 | | 1,276.0 | 4.32± | 0.57 |
| 2. Crittam at 0.2%+ Solfobar at 0.2% | 53 | 31 | 11 | 4 | 1 | | | | 114.5 | | |
| | 31 | 24 | 17 | 14 | 8 | 6 | | | 488.5 | | |
| | 32 | 33 | 24 | 8 | 2 | 1 | | | 237.0 | | |
| | 53 | 23 | 12 | 8 | 4 | | | | 185.0 | | |
| Mean | 42.3 | 27.8 | 16 | 8.5 | 3.8 | 1.8 | | | 1,025.0 | 2.56± | 0.81 |
| Crittox 2 treatments: first at 0.3%, then at 0.2% | 53 | 32 | 13 | 1 | 1 | | | | 100.0 | | |
| | 65 | 13 | 11 | 5 | 5 | 1 | | | 194.0 | | |
| | 69 | 20 | 6 | 2 | 3 | | | | 101.0 | | |
| | 58 | 20 | 11 | 8 | 2 | 1 | | | 178.5 | | |
| Mean | 61.3 | 21.3 | 10.3 | 4 | 2.8 | 0.5 | | | 573.5 | 1.43± | 0.24 |
| 4. Crittox at 0.2%+ Solfobar at 0.20% | 72 | 24 | 3 | 1 | | | | | 42.0 | | |
| | 76 | 21 | 3 | | | | | | 31.5 | | |
| | 70 | 20 | 10 | | | | | | 55.0 | | |
| | 83 | 14 | 3 | | | | | | 24.5 | | |
| Mean | 75.3 | 19.8 | 4.8 | 0.3 | | | | | 153.0 | 0.38± | 0.06 |
| 5. Specimen: Not used in the first 4 treatments; the Crittam at 0.2% | 11 | 15 | 20 | 16 | 11 | 11 | 9 | 7 | 1,143.5 | | |
| | 22 | 29 | 10 | 14 | 13 | 5 | 4 | 3 | 964.0 | | |
| | 21 | 13 | 20 | 13 | 13 | 5 | 7 | 8 | 1,533.0 | | |
| | 9 | 13 | 18 | 10 | 15 | 15 | 17 | 3 | 1,958.5 | | |
| Mean | 15.8 | 17.5 | 17.0 | 13.3 | 13.3 | 9 | 9.3 | 5.3 | 5,597.5 | 13.99± | 2.21 |

EXAMPLE VIII

In a test dealing with the treatment of root rot of beetroot, 100 incrustations were treated with ethylenebisdithiocarbamate of zinc (Zinc EBDC) and ethylenebisdithiocarbamate of zinc plus barium polysulfide, in a ratio of 60:40, and were examined, the test being repeated 6 times, the number of plants alive after a lapse of 3 weeks was as follows:

| | I | II | III | IV | V | VI | Total |
|---|---|---|---|---|---|---|---|
| Zinc EBDC | 160 | 80 | 40 | 100 | 116 | 105 | 601 |
| Zinc EBDC 60, barium polysulfide 40 | 132 | 139 | 163 | 100 | 142 | 120 | 796 |
| Control | 48 | 36 | 41 | 30 | 56 | 50 | 261 |

In this specification and the claims, p.p.m. is weight parts per million and percent and "parts," and ratios, unless otherwise indicated, are on a weight basis.

The term "barium polysulfide" designates a mixture of disulfide, trisulfide and tetrasulfide, as indicated in such standard texts as College Chemistry, by Linus Pauling, published 1950, see page 364, and page 673 of Hachk's Chemical Dictionary, third ed., McGraw-Hill.

While the invention has been described with reference to particular embodiments, various modifications will occur to those skilled in the art, and it is desired to secure by these Letters Patent all such variations.

What is claimed is:

1. A fungicide composition comprising as fungicidally active components thereof the combination of a metal salt of carbamic acid derivatives selected from the group consisting of ethylenebisdithiocarbamic acid and dimethyldithiocarbamic acid and mixtures of said acids, and a barium compound selected from the group consisting of barium sulfide and barium polysulfide, the weight ratio of said carbamic acid derivative salt to said barium compound being in the range of from about 10:90 to about 90:10.

2. The fungicide composition according to claim 1 wherein said carbamic acid derivative salt is zinc ethylenebisdithiocarbamate.

3. The fungicide composition according to claim 2 wherein said barium compound is barium polysulfide, and the weight ratio of said thiocarbamate to said polysulfide is in the range of from about 20:80 to about 80:20.

4. The fungicide composition according to claim 1 wherein said carbamic acid derivative salt is zinc dimethyldithiocarbamate.

5. The fungicide composition according to claim 1 wherein said barium compound is barium sulfide and the weight ratio of said thiocarbamate to said sulfide is in the range of from about 10:90 to about 60:40.

6. The fungicide composition according to claim 1 wherein said barium compound is barium polysulfide and the weight ratio of said thiocarbamate to said polysulfide is in the range of from about 20:80 to about 70:30.

7. A method of reducing the injurious effects of fungi which comprises applying at the site which is to be protected a fungicidal composition which comprises as an active fungicidal component thereof the combination of metal salt of a carbamic acid derivative selected from the group consisting of ethylenebisdithiocarbamic acid and dimethyldithiocarbamic acid and mixtures of said acids, and a barium compound selected from the group consisting of barium sulfide and barium polysulfide, the weight ratio of said carbamic acid derivative salt to said barium compound being in the range of from about 10:90 to about 90:10.

8. The method according to claim 7 wherein said carbamic acid derivative salt is zinc ethylenebisdithiocarbamate.

9. The method according to claim 8 wherein said barium compound is barium polysulfide, and the weight ratio of said thiocarbamate to said polysulfide is in the range of from about 20:80 to about 80:20.

10. The method according to claim 7 wherein said carbamic acid derivative salt is zinc dimethyldithiocarbamate.

11. The method according to claim 10 wherein said barium compound is barium sulfide and the weight ratio of said thiocarbamate to said sulfide is in the range of from about 10:90 to about 60:40.

12. The method according to claim 10 wherein said barium compound is barium polysulfide and the weight ratio of said thiocarbamate to said polysulfide is in the range of from about 20:80 to about 70:30.

References Cited by the Examiner
UNITED STATES PATENTS

| | | | |
|---|---|---|---|
| 2,457,674 | 12/48 | Heuberger | 167—22 |
| 2,974,156 | 3/61 | Sobatzki | 167—22 |
| 3,030,263 | 4/62 | Zeile et al. | 167—14 |

JULIAN S. LEVITT, *Primary Examiner.*

M. O. WOLK, *Examiner.*